United States Patent
Jadot et al.

(10) Patent No.: US 7,221,117 B2
(45) Date of Patent: May 22, 2007

(54) METHOD AND SYSTEM FOR CONTROLLING AN ELECTRIC MOTOR IN THE EVENT OF FLUX REDUCTION

(75) Inventors: Fabrice Jadot, Pacy sur Eure (FR); Francois Malrait, Jouy sur Eure (FR); Pierre Rouchon, Meudon (FR); Rodolphe Sepulchre, Neufre (BE)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 11/367,462

(22) Filed: Mar. 6, 2006

(65) Prior Publication Data
US 2006/0208689 A1    Sep. 21, 2006

(30) Foreign Application Priority Data
Mar. 15, 2005   (FR) ................................. 05 50661

(51) Int. Cl.
*H02P 21/12* (2006.01)
(52) U.S. Cl. .................. 318/268; 318/479; 318/504; 318/812
(58) Field of Classification Search ................ 318/268, 318/434, 478, 479, 504, 812
See application file for complete search history.

(56) References Cited

U.S. PATENT DOCUMENTS

| | | | | |
|---|---|---|---|---|
| 3,594,623 A * | 7/1971 | Lamaster | ................... | 318/137 |
| 3,919,634 A * | 11/1975 | Appel et al. | ................ | 324/163 |
| 4,335,343 A * | 6/1982 | Dreiseitl et al. | ............ | 318/798 |
| 4,629,961 A * | 12/1986 | Blaschke | .................... | 318/803 |
| 4,677,360 A | 6/1987 | Garces | | |
| 5,162,727 A * | 11/1992 | Hindsberg et al. | .......... | 324/772 |
| 5,204,607 A | 4/1993 | Huegel et al. | | |
| 5,589,754 A * | 12/1996 | Heikkila | ..................... | 318/805 |
| 6,438,321 B1 * | 8/2002 | Lin | ............................. | 388/800 |
| 2004/0135533 A1 | 7/2004 | Harakawa et al. | | |

FOREIGN PATENT DOCUMENTS

| | | | |
|---|---|---|---|
| EP | 0 419 761 A2 | 4/1991 | |
| EP | 1 480 330 A2 | 11/2004 | |

\* cited by examiner

*Primary Examiner*—Bentsu Ro
(74) *Attorney, Agent, or Firm*—Oblon, Spivak, McClelland, Maier & Neustadt, P.C.

(57) ABSTRACT

The present invention relates to a method and a system for correcting references ($x_{ref}$), in the case of flux reduction, used in a speed variator for controlling an electric motor M having a three-phase supply, for example of the synchronous or asynchronous type.

This method consists, in particular, of using a dynamic system (MM) representing a model of the motor to be controlled, provided with at least one integrator (Int) and having as input the difference between a limited value of a control voltage (u) to be applied to the motor (M) and the value of a calculated reference voltage ($u_{ref}$).

4 Claims, 1 Drawing Sheet

METHOD AND SYSTEM FOR CONTROLLING AN ELECTRIC MOTOR IN THE EVENT OF FLUX REDUCTION

The present invention relates to a method and a system for correcting references used in a speed variator for controlling an electric motor having a three phase supply, for example of the synchronous or asynchronous type. The invention is equally used in a conventional vector control scheme in open loop without feedback of a speed measurement or in closed loop with feedback of a speed measurement.

In a conventional open loop vector control scheme, it is known to apply a speed (or frequency) reference input and a flux reference to be applied to the motor. According to these two data and current measurements in the different phases of the motor, the reference flux current and the reference torque current are determined. On the basis of these two currents the control voltages to be applied to the motor are calculated from the equations of the motor model. In a known way, these voltages are applied to the motor using a normal Pulse Width Modulation voltage inverter, referred to as a PWM inverter. Such a PWM inverter supplies the motor with a series of pulses of fixed amplitude, positive or negative, and width modulated, according to a voltage control law.

In a vector control scheme, it is known that when a speed reference greater than the nominal speed of the motor and a constant flux reference are imposed on input, the voltage calculated according to these references can be incompatible with the voltage available on the mains or with a voltage limitation chosen for the motor to be supplied. In such a situation, it is difficult to maintain the flux at a constant value and this provokes instabilities such as current, speed or torque oscillations in the motor. This region of instability is called the flux reduction region.

This problem has been tackled in the patent U.S. Pat. No. 5,204,607 which proposes correcting the reference flux when the determined reference voltage becomes greater than the voltage that the inverter can supply. In order to do this the system makes a comparison between the reference voltage and the maximum voltage that the inverter can supply. The calculated difference is used to determine a correction value to be applied to the reference flux. The reference flux is corrected as long as the reference voltage for the inverter is less than or equal to the maximum voltage that the inverter can supply. The flux reference and the real flux are therefore always in agreement and this prevents flux reduction.

However, in this system, the current references are not corrected dynamically and it cannot therefore be guaranteed the same stability properties within the voltage limitation zone and outside of this zone.

The purpose of the invention is therefore to propose a method and a system for correction of references used in a speed variator for the control of an electric motor, making it possible to retain the same motor control stability properties both within the flux reduced region (within voltage restriction) and outside of the latter (outside of voltage restriction).

For this purpose the invention consists in carrying out a dynamic correction of the flux and current references applied as inputs of the speed variator control law.

The invention relates more particularly to a method for controlling an electric motor having a three phase supply, used in a speed variator functioning according to a control law in which flux and current references are used for calculating a reference voltage to be applied to the motor, the said method being characterized in that it consists in determining a correction value for the flux and current references when the calculated reference voltage has a value greater that a limit value, in applying this correction value to the flux and current references and in that the correction value of the flux and current references is calculated by a dynamic system representing a model of the motor to be controlled, provided with at least one integrator and having as input the difference between a limited value of a control voltage to be applied to the motor and the calculated value of the reference voltage.

Unlike the prior art, the method of the invention makes it possible to correct dynamically both the reference flux and the reference currents which makes it possible to have a complete regulation system having magnitude equal to that of the controlled motor.

According to one feature of this method, if the calculated reference voltage has a value greater than the limit value, the control voltage to be applied to the motor is equal to the limit value.

The invention also relates to a control system used in a speed variator for an electric motor having a three phase supply, the said system comprising means for calculating a reference voltage to be applied to the motor as a function of flux and current references in particular, the said system being characterized in that it comprises means for determining a correction value for the flux and current references and applying this flux and currents reference correction value to be applied when the reference voltage has a value greater than a limit value, the correction value being calculated using a dynamic system representing a model of the motor to be controlled, provided with at least one integrator and having as input the difference between a limited value of a control voltage to be applied to the motor and the calculated reference voltage value.

According to one feature, this system also comprises means for limiting the control voltage to be applied to the motor to a value equal to the limit value when the calculated reference voltage has a value greater than the limit value.

According to the invention, in the event of flux reduction, in order to retain the properties of stability in the control of the motor, a dynamic correction of the flux and current references is therefore carried out whilst complying with the model of the motor.

Other characteristics and advantages will appear in the following detailed description referring to an embodiment given by way of example and shown in the appended drawings in which.

A conventional mathematical model of a motor M can be expressed by the following equation:

$$\frac{d}{dt}\begin{bmatrix} id \\ iq \\ \varphi r \end{bmatrix} = A \begin{bmatrix} id \\ iq \\ \varphi r \end{bmatrix} + B \begin{bmatrix} Vd \\ Vq \\ 0 \end{bmatrix} \quad (1)$$

In which id represents the flux current of the stator, iq represents the torque current of the motor, $\varphi r$ represents the rotor flux and Vd and Vq represent the control voltages applied to the motor. A and B represent matrices whose values are calculated from the motor's parameters and from the speed of the rotor. Additional information on this equation is available in the patent U.S. Pat. No. 6,281,659.

This equation (1) can be written as follows:

$$\frac{d}{dt}[x] = Ax + Bu \tag{2}$$

in which x defines the state of the system to be controlled and corresponds to the current supplied to the motor and to the rotor flux and u represents the control voltage applied to the motor.

The control objective of the motor is to create a voltage control u for regulating the state x of the system to a reference $x_{ref}$ defined by the equation (3) below.

Figure 1:
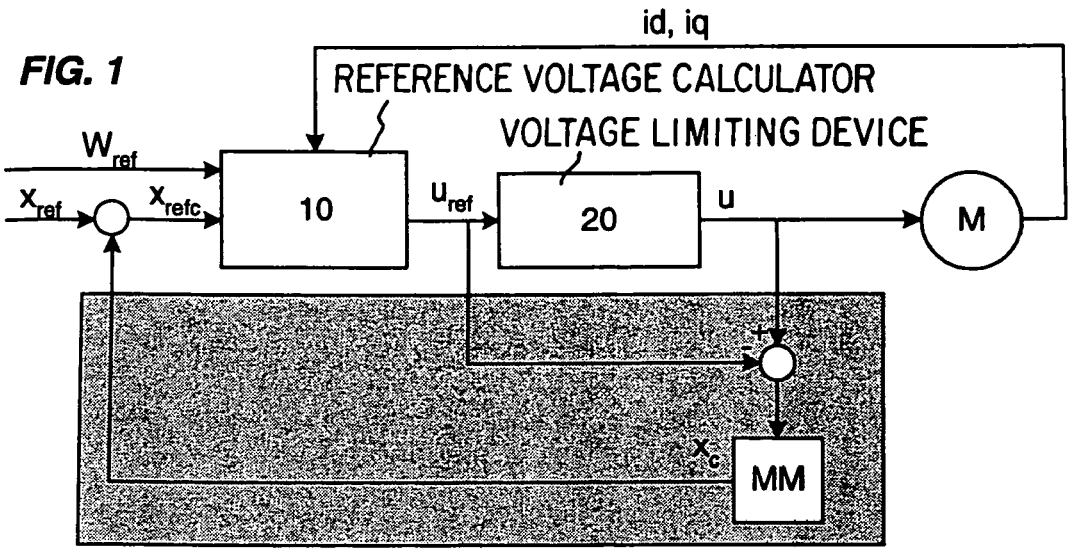
FIG. 1 shows a vector control scheme used in a speed variator for an electric motor indicating, in the shaded part, the stages constituting the invention.

According to FIG. 1, on the basis of the mathematical model of the motor M defined by the equation (2) above, the flux and current references, defined by $x_{ref}$, applied as input can be defined as follows:

$$\frac{d}{dt}[x_{ref}] = Ax_{ref} + Bu_{ref} + C \tag{3}$$

in which $u_{ref}$ is a reference voltage control calculated from the speed reference $W_{ref}$ and the flux and current references $x_{ref}$ and intended to be applied to the motor M and C represents a term for regulating x. From this it is derived that the reference voltage $u_{ref}$, calculated (10, FIG. 1) from the equations of the model of the motor, is defined by the following equation (4):

$$Bu_{ref} = \frac{d}{dt}[x_{ref}] - Ax_{ref} - C \tag{4}$$

If, in particular, the flux and speed references imposed on input are inconsistent, the calculated reference $u_{ref}$ can prove to be incompatible with the voltage supplied by the power supply mains or with a limit voltage specified for a normal functioning of the motor M.

In such a situation, if the modulus value of the reference voltage $u_{ref}$ is greater than a limit voltage value $u_{lim}$, a voltage limiting device (20) is used making it possible to limit the calculated reference voltage $u_{ref}$ to a value u for example whose modulus is equal to the determined limit value $u_{lim}$. This limit value $u_{lim}$ can correspond for example to the maximum voltage value delivered by the power supply mains or to the maximum value that it is possible to apply to the motor M. The voltage actually applied to the motor is therefore the voltage u whose modulus is equal to a value $u_{lim}$ and not the voltage $u_{ref}$.

The dynamics of the difference between the state of the system and the flux and current references $x_{ref}$ is defined by the following equation:

$$\frac{d}{dt}[x - x_{ref}] = A[x - x_{ref}] + B[u - u_{ref}] - C \tag{5}$$

As long as the reference voltage is less than the voltage limit value, the values of u and of $u_{ref}$ are equal. The following is therefore obtained:

$$\frac{d}{dt}[x - x_{ref}] = A[x - x_{ref}] - C \tag{6}$$

However, when working with voltage limitation, the above term $u-u_{ref}$ is not zero. The situation is in the flux reduced region in which it is not possible to maintain the flux of the rotor constant, which can result in instabilities in the control of the motor M. The term $u-u_{ref}$ introduces a non-zero difference between the flux and current references $x_{ref}$ and the system (equation (5) above). According to the invention, this term $u-u_{ref}$ is not therefore directly transferred to the difference $x-x_{ref}$. It is transmitted via a dynamic system defined by the above equation (5) having integrators. However when the system exits from the voltage limitation, the term $u-u_{ref}$ changes to 0 but the difference $x-x_{ref}$ becomes zero only after a time dependant on the constants of the matrix A of the system.

In order to improve the dynamic performance for the trajectories entering and leaving the voltage limitation, a dynamic correction of the flux and current references $x_{ref}$ is carried out in order to make the flux reference attainable and thus to retain the stability properties of the control of the motor M outside of the voltage limitation zone and inside of the voltage limitation zone. The principle of the dynamic correction of the flux and current references $x_{ref}$ is to calculate the correction values $x_c$ as follows:

$$\frac{d}{dt}[x_c] = Ax_c + B(u - u_{ref}) \tag{7}$$

This equation (7) expresses a model of the motor in which $x_c$ is the calculated correction to apply to the flux and current references $x_{ref}$, u is the limited control voltage applied to the motor, $u_{ref}$ is the reference voltage calculated from the speed reference $W_{ref}$ and from the flux and current references $x_{ref}$ and defined for example by the above equation (4).

Figure 2:
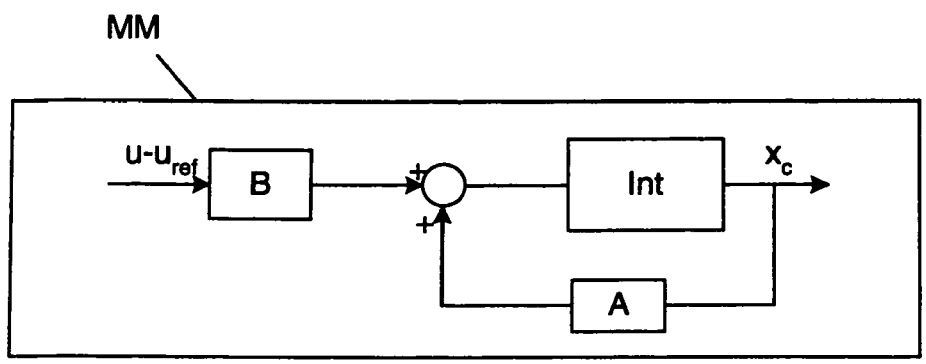
FIG. 2 is a block diagram showing the functioning of the model of the motor used in the invention for carrying out a dynamic correction of the flux and current references.

The difference between the calculated reference $u_{ref}$ and the limited voltage u is inserted directly into an equation system representing a model of the motor. In this way is calculated, using a dynamic system MM provided with integrators (Int in FIG. 2) whose number is equal to the number of states of the motor, the value of $x_c$ from the equation (7) defined above.

The calculated correction value $x_c$ s applied directly as input to the flux and current references $x_{ref}$ in order to correct the latter. The corrected flux and current references $x_{refc}$ are therefore equal to the sum of the flux and current references $x_{ref}$ and the calculated correction values $x_c$.

The calculation of a correction value $x_c$ is carried out as long as a voltage difference exists between u and $u_{ref}$.

It can be seen in the above equation (7) that, outside of the voltage limitation zone, that is to say when u and $u_{ref}$ have equal values, the values of $x_c$ converge naturally towards zero (according to the natural dynamics of the motor). On the other hand, in the voltage limitation zone, the difference $u-u_{ref}$ is negative and the values of $x_c$ tend to reduce. Consequently, the corrected flux and current references $x_{refc}$ reduce until the voltage difference between u and $u_{ref}$ is eliminated.

The value of the corrected flux and current references $x_{refc}$ is expressed by the following equation:

$$\frac{d}{dt}[x_{refc}] = \frac{d}{dt}[x_{ref}] + \frac{d}{dt}[x_c] \quad (8)$$

On carrying out this calculation, the following result is obtained:

$$\frac{d}{dt}[x_{refc}] = Ax_{refc} + Bu + C \quad (9)$$

From the motor model defined by the above equation (2) according to which $$\frac{d}{dt}[x] = Ax + Bu,$$

it is noted that if the matrix A is stable, the dynamics of the difference between the state of the system and the corrected flux and current references defined by $x-x_{refc}$ verifies $$\frac{d}{dt}[x - x_{refc}] = A[x - x_{refc}] - C \quad (11)$$

This equation (11) which manages the dynamics of the difference between the state of the system and the corrected flux and current references $x_{refc}$, whatever may be the value of the voltage u, has the same stability properties throughout the operating range as the difference $x-x_{ref}$ which manages the dynamics of the difference between the state of the system and the flux and current references outside of the voltage limitation zone. In fact, outside of the voltage limitation zone, ($x_c=0$ and $u=u_{ref}$), the equations (2) and (3) express the dynamics of the difference $x-x_{ref}$ equal to:

$$\frac{d}{dt}[x - x_{ref}] = A[x - x_{ref}] - C$$

The stability properties of the system obtained in the zone outside of voltage limitation are therefore well retained in the flux reduced region. The trajectories entering and leaving the voltage limitation region are naturally managed by the dynamic correction of the flux and current references without modifying the stability and trajectory following properties of the system.

It is of course understood that other variants and improvements in detail can be considered and even the use of equivalent means can be considered without departing from the scope of the invention.

The invention claimed is:

1. A method for controlling an electric motor (M) having a three phase supply, configured to be used in a speed variator configured to function according to a control law in which flux and current references ($x_{ref}$) are used for calculating a reference voltage ($u_{ref}$) to be applied to the motor (M), the method comprising:
   determining a correction value ($x_c$) for the flux and current references ($x_{ref}$) when the calculated reference voltage ($u_{ref}$) has a value greater than a limit value ($u_{lim}$);
   applying the correction value ($x_c$) to the flux and current references ($x_{ref}$); and
   calculating the correction value ($x_c$) of the flux and current references ($x_{ref}$) utilizing a dynamic system (MM) representing a model of the motor (M) to be controlled, provided with at least one integrator (Int), and having as input the difference between a limited value of a control voltage (u) to be applied to the motor (M) and the calculated reference voltage ($u_{ref}$).

2. The method according to claim 1, wherein, if the calculated reference voltage ($u_{ref}$) has a value greater than the limit value ($u_{lim}$), the control voltage (u) to be applied to the motor is equal to the limit value ($u_{lim}$).

3. A control system used in a speed variator for an electric motor having a three phase supply, the system comprising:
   means for calculating a reference voltage ($u_{ref}$) to be applied to the motor (M) as a function of flux and current references ($x_{ref}$); and
   means for determining a correction value ($x_c$) for the flux and current references ($x_{ref}$) and applying the determined flux and currents reference correction value ($x_c$) when the reference voltage ($u_{ref}$) has a value greater than a limit value ($u_{lim}$), the correction value ($x_c$) being calculated using a dynamic system (MM) representing a model of the motor to be controlled, provided with at least one integrator (Int), and having as input the difference between a limited value of a control voltage (u) to be applied to the motor (M) and the calculated reference voltage ($u_{ref}$).

4. The system according to claim 3, further comprising:
   means for limiting the control voltage (u) to be applied to the motor (M) to a value equal to the limit value ($u_{lim}$) when the calculated reference voltage ($u_{ref}$) has a value greater than the limit value ($u_{lim}$).

* * * * *